United States Patent
Fukushima et al.

(10) Patent No.: US 8,064,656 B2
(45) Date of Patent: Nov. 22, 2011

(54) IMAGE PROCESSING APPARATUS, IMAGING APPARATUS, IMAGE PROCESSING METHOD, AND COMPUTER PROGRAM

(75) Inventors: Seigo Fukushima, Kanagawa (JP); Shigeru Kashiwagi, Tokyo (JP)

(73) Assignee: Sony Corporation (JP)

( * ) Notice: Subject to any disclaimer, the term of this patent is extended or adjusted under 35 U.S.C. 154(b) by 853 days.

(21) Appl. No.: 12/148,612

(22) Filed: Apr. 21, 2008

(65) Prior Publication Data

US 2008/0260255 A1    Oct. 23, 2008

(30) Foreign Application Priority Data

Apr. 23, 2007    (JP) ................ P2007-112591

(51) Int. Cl.
*G06K 9/00* (2006.01)
(52) U.S. Cl. ........ 382/118; 382/103; 382/181; 382/190; 348/231.2
(58) Field of Classification Search .......... 382/118, 382/181, 190, 291
See application file for complete search history.

(56) References Cited

U.S. PATENT DOCUMENTS

| | | | |
|---|---|---|---|
| 6,754,389 B1 * | 6/2004 | Dimitrova et al. | 382/224 |
| 7,003,139 B2 * | 2/2006 | Endrikhovski et al. | 382/118 |
| 7,123,754 B2 * | 10/2006 | Matsuo et al. | 382/118 |
| 7,130,446 B2 * | 10/2006 | Rui et al. | 382/103 |
| 7,327,891 B2 * | 2/2008 | Covell et al. | 382/224 |
| 7,412,081 B2 * | 8/2008 | Doi | 382/118 |
| 7,519,200 B2 * | 4/2009 | Gokturk et al. | 382/118 |
| 7,716,157 B1 * | 5/2010 | Bourdev et al. | 1/1 |
| 7,822,233 B2 * | 10/2010 | Nagaoka et al. | 382/118 |
| 2008/0089561 A1 | 4/2008 | Zhang | |

FOREIGN PATENT DOCUMENTS

| | | |
|---|---|---|
| CN | 101523412 A | 9/2009 |
| JP | 07-128031 A | 5/1995 |
| JP | 2001167110 A | 6/2001 |
| JP | 3312105 B2 | 8/2002 |
| JP | 2003-204541 A | 7/2003 |
| JP | 2005-327249 | 11/2005 |

OTHER PUBLICATIONS

Office Action from Chinese Application No. CN 200810095036.7, dated Apr. 6, 2010.
Office Action from Japanese Application No. 2007-112591, dated Mar. 22, 2011.

* cited by examiner

*Primary Examiner* — Jason M Repko
*Assistant Examiner* — Siamak Harandi
(74) *Attorney, Agent, or Firm* — Lerner, David, Littenberg, Krumholz & Mentlik, LLP

(57) ABSTRACT

Disclosed herein is an image processing apparatus, including a representative face extraction unit configured to detect face images in an image frame that forms part of video image data, and select, from the detected face images, a face image to be used as index information. The representative face extraction unit is configured to calculate a score of each of the face images detected in the image frame based on characteristics of the face image, and select a detected face image whose score is high as an index-use face image.

8 Claims, 12 Drawing Sheets

FIG. 9

(b) METADATA (METADATA FOR ONE FACE)

| FIELD NAME | SIZE | CONTENTS |
|---|---|---|
| HIGHER-ORDER 4 BYTES OF FACE DETECTION TIME INFORMATION | 4byte | HIGHER-ORDER 4 BYTES OF TIME INFORMATION OF FIELD IN WHICH REPRESENTATIVE FACE HAS BEEN DETECTED |
| LOWER-ORDER 4 BYTES OF FACE DETECTION TIME INFORMATION | 4byte | LOWER-ORDER 4 BYTES OF TIME INFORMATION OF FIELD IN WHICH REPRESENTATIVE FACE HAS BEEN DETECTED |
| FACE POSITION | 4byte | OFFSET OF UPPER-LEFT CORNER OF DETECTED FACE FROM UPPER-LEFT CORNER OF ORIGINAL IMAGE (HIGHER-ORDER 16 BITS:FACE POSITION (X), LOWER-ORDER 16 BITS: FACE POSITION (Y)) |
| FACE SIZE | 4byte | INFORMATION ABOUT SIZE OF DETECTED FACE IN ORIGINAL IMAGE (HIGHER-ORDER 16 BITS:FACE WIDTH, LOWER-ORDER 16 BITS: FACE HEIGHT) |
| FACE EVALUATION VALUE SCORE | 4byte | VALUE OF SCORE INDICATING EXTENT OF FACE LIKELINESS |
| AGGREGATE SCORE | 4byte | VALUE OF AGGREGATE SCORE |

(a) FACE INFORMATION MANAGEMENT FILE

| NUMBER OF FACES (4[Byte]) |
| METADATA FOR REPRESENTATIVE FACE[0] (20[Byte]) |
| METADATA FOR REPRESENTATIVE FACE[1] (20[Byte]) |
| METADATA FOR REPRESENTATIVE FACE[2] (20[Byte]) |
| .. |

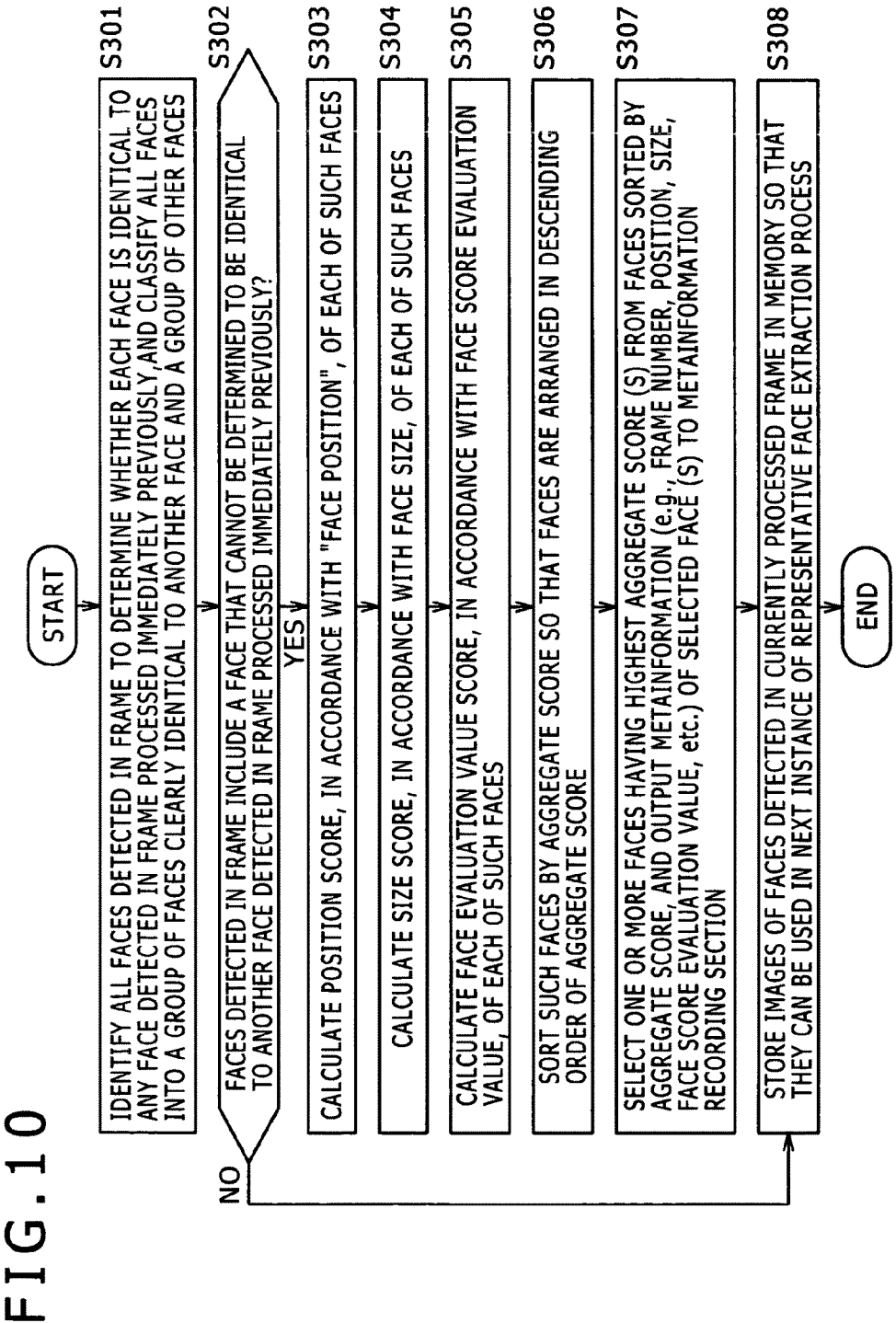

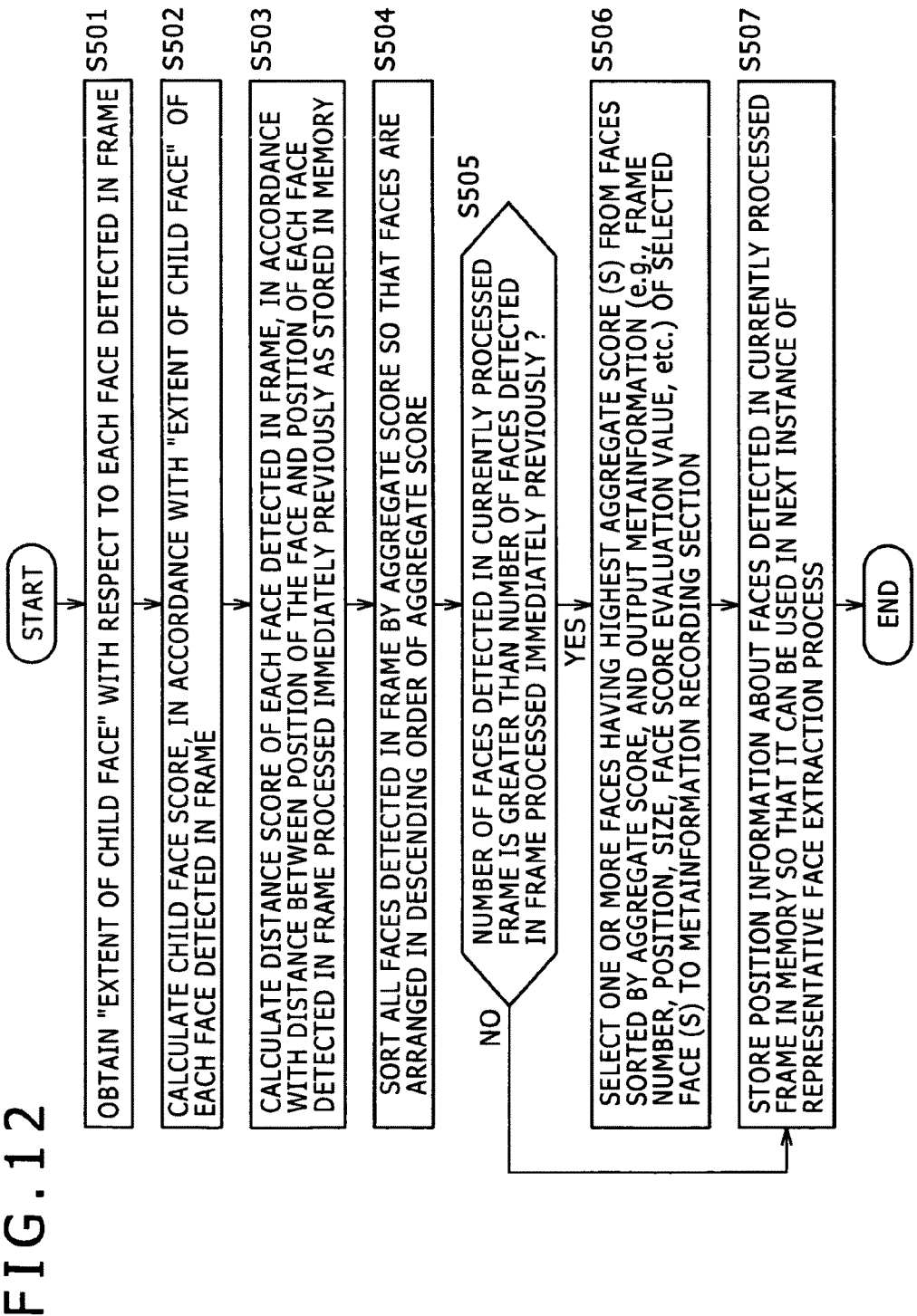

IMAGE PROCESSING APPARATUS, IMAGING APPARATUS, IMAGE PROCESSING METHOD, AND COMPUTER PROGRAM

CROSS-REFERENCE TO RELATED APPLICATIONS

The present application claims priority from Japanese Patent Application No. JP 2007-112591, filed in the Japanese Patent Office on Apr. 23, 2007, the entire content of which is incorporated herein by reference.

BACKGROUND OF THE INVENTION

1. Field of the Invention

The present invention relates to an image processing apparatus, an imaging apparatus, an image processing method, and a computer program. In more detail, the present invention relates to an image processing apparatus, an imaging apparatus, an image processing method, and a computer program which display a list of thumbnail images corresponding to images selected from among multiple pieces of video image data obtained by photographing using a video camera, for example, and perform a process of starting playback of a video with a position corresponding to a specified one of the thumbnail images in the list.

2. Description of the Related Art

Today, many imaging apparatuses, such as digital cameras or digital video cameras, and many image processing apparatuses, such as DVD players, have a function of displaying a list of image data stored in a storage medium on an image display section or a monitor, for example.

For example, some imaging apparatuses or DVD players capable of playing a video have a capability to display a menu in which a title and chapters of the video are arranged, allow a user to select a desired content from the displayed menu, and play the selected content. Further, some devices are capable of performing a so-called index display process. The index display process is a process of displaying, in size-reduced (thumbnail) form, an image representative of a video obtained by one photographing process, that is, from start to end of photographing, using an imaging apparatus, for example. This makes it possible to start playback of the video with a frame of that image displayed on a display in size-reduced form, using this image as an index.

When indices of video data are displayed, size-reduced images of frames that are selected from among all the frames that constitute the video data are displayed. Accordingly, in order to allow the user to easily grasp contents of the video data, as significant frames as possible have to be selected, as index-use images, from among the video data. One technique for achieving this is described in Japanese Patent No. 3312105, for example. According to this technique, a search is performed in video image data using an object dictionary in which an image of an object to be searched for has been registered, so that an image that resembles the registered image will be selected as an index-use frame image. The registration of the image of the object to be searched for in the object dictionary is performed beforehand by learning.

According to this technique, an index image corresponding to the specific registered object can be selected from among one unit of data obtained by one recording operation (this unit of data will be hereinafter referred to as "one content"), and prior registration of the object image is required. This technique has a problem in that images corresponding to unregistered objects may not be selected as indices. Suppose, for example, that a plurality of people appear in different time periods in the same content. In this case, a frame that includes a face of a person corresponding to a specific registered object can be selected as an index, while frames that include only other people may not be displayed as indices. Such a technique has a problem in that a face (e.g., a face of a child of the user's) which the user desires to be displayed as an index image may not be displayed as an index image.

In an application (hereinafter referred to as a "face index") such as a video camera that displays images of faces included in a video image when displaying indices of the video image, it may not be reasonable to display all faces that are included in the content (i.e., the video image) as the indices. For example, when a scene (e.g., a choral competition, a field day, etc.) in which many faces appear has been photographed, images of too many faces will be displayed as indices. An original purpose of displaying the indices is to enable quick grasp of an outline of the content. When too many faces are displayed as indices as in the above example, this purpose is not accomplished.

SUMMARY OF THE INVENTION

The present invention addresses the above-identified, and other problems associated with methods and apparatuses in the past, and provides an image processing apparatus, an imaging apparatus, an image processing method, and a computer program which, when extracting a face image from video data and displaying the extracted face image as an index, enable extraction and display of the face image as the index without the need for prior registration of an object or the like, and also enable, even if a large number of faces are included in the video data, efficient selection of various human faces and display of the selected faces as indices.

According to one embodiment of the present invention, there is provided an image processing apparatus including a representative face extraction unit configured to detect face images in an image frame that forms part of video image data, and select, from the detected face images, a face image to be used as index information, wherein the representative face extraction unit is configured to calculate a score of each of the face images detected in the image frame based on characteristics of the face image, and select a detected face image whose score is high as an index-use face image.

According to another embodiment of the present invention, there is provided an imaging apparatus including: an imaging section; and a representative face extraction unit configured to accept video image data obtained by photographing by the imaging section, detect face images in an image frame that forms part of the accepted video image data, and select, from the detected face images, a face image to be used as index information, wherein the representative face extraction unit is configured to calculate a score of each of the face images detected in the image frame based on characteristics of the face image, and select a detected face image whose score is high as an index-use face image.

According to yet another embodiment of the present invention, there is provided an image processing method employed in an image processing apparatus including a representative face extraction unit, the method including the steps of the representative face extraction unit detecting face images in an image frame that forms part of video image data, and selecting, from the detected face images, a face image to be used as index information, wherein the detecting and selecting step has the steps of calculating a score of each of the face images detected in the image frame based on characteristics of the face image, and selecting a detected face image whose score is high as an index-use face image.

According to yet another embodiment of the present invention, there is provided a computer program for causing an image processing apparatus including a representative face extraction unit to perform image processing, the computer program causing the representative face extraction unit to execute the steps of detecting face images in an image frame that forms part of video image data, and selecting, from the detected face images, a face image to be used as index information, wherein the detecting and selecting step has the steps of calculating a score of each of the face images detected in the image frame based on characteristics of the face image, and selecting a detected face image whose score is high as an index-use face image.

The computer program according to this embodiment of the present invention is a computer program that can be provided, to a general-purpose computer system capable of executing various program codes, for example, in a computer-readable form via a storage medium or a communication medium. When such a program is provided in a computer-readable form, processing in accordance with the program is achieved on the computer system.

Other characteristics and advantages of the present invention will become more apparent from the following detailed description of embodiments of the present invention when taken in conjunction with the accompanying drawings.

According to one embodiment of the present invention, in the case where the face images to be used as index images are selected from among the video image data, scores for the faces detected in the image frame, such as a position score in accordance with the position of the face within the frame, a size score in accordance with the size of the face, a face evaluation value score in accordance with the extent of face likeliness, and a distance score in accordance with a difference in face-detected position with a previous face-detected frame, are calculated, and the face images having higher aggregate scores, which are calculated based on the above scores, are preferentially adopted as indices. Therefore, it is possible to efficiently select only faces having high scores from among video image data in which a large number of faces appear, in order to generate face index information that is convenient for the user.

BRIEF DESCRIPTION OF THE DRAWINGS

FIGS. 9A and 9B show an exemplary structure of metadata for index faces generated in the image processing apparatus according to one embodiment of the present invention;

FIG. 10 is a flowchart illustrating an index face selection sequence that involves personal identification, performed in the image processing apparatus according to one embodiment of the present invention;

FIG. 12 is a flowchart illustrating an index face selection sequence that involves child face recognition, performed in the image processing apparatus according to one embodiment of the present invention.

DETAILED DESCRIPTION OF THE PREFERRED EMBODIMENTS

Figure 1:
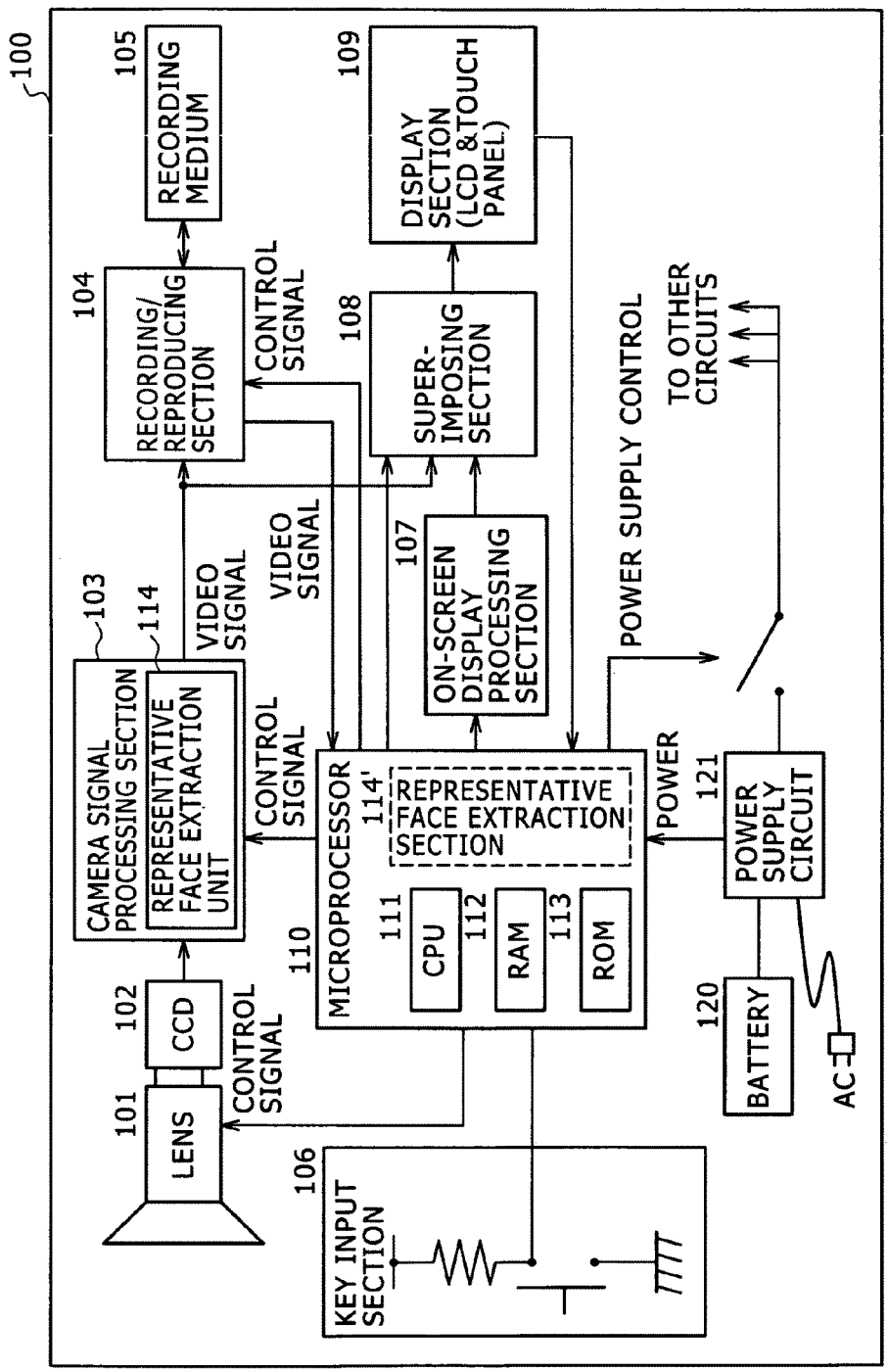
FIG. 1 is a block diagram for explaining about a structure of an imaging apparatus, which is an image processing apparatus according to one embodiment of the present invention.

Hereinafter, an image processing apparatus, an imaging apparatus, an image processing method, and a computer program according to embodiments of the present invention will be described in detail with reference to the accompanying drawings.

First, referring to a block diagram of FIG. 1, a structure of an imaging apparatus 100, which is one example of an image processing apparatus according to the present embodiment, will now be described below. When a photographing start signal is inputted, for example, from a key input section 106, which is a user operation section, to a microprocessor 110, the microprocessor 110 outputs a control signal to each relevant part, so that a photographing process is started. Under control of the microprocessor 110, a focusing mechanism, a shutter mechanism, an aperture mechanism, and so on of a lens 101 are controlled to take an image of a subject, and the image is supplied to a charge coupled device (CCD) 102.

The CCD 102 subjects the image to optical to electrical conversion to obtain an electrical signal corresponding to the image (image information) of the subject, and outputs the electrical signal to a camera signal processing section 103. The camera signal processing section 103 subjects the electrical signal (i.e., an image signal) inputted from the CCD 102 to signal processing. Examples of the signal processing include camera signal processing such as correlated double sampling (CDS), automatic gain control (AGC), analog/digital (A/D) conversion, auto focus (AF), auto exposure (AE), and auto white balance (AWB).

The camera signal processing section 103 includes a representative face extraction unit 114. The representative face extraction unit 114 performs a face detection process and an index-use face selection process. The face detection process is a process of detecting whether each piece of frame data in the image obtained by photographing includes a human face region. The index-use face selection process is a process of determining whether a face image detected should be selected as an index image. Hereinafter, the "face detection process" and the "index-use face selection process" will be referred to collectively as a "representative face extraction process". Note that a known face detection process algorithm is applicable to the face detection process, i.e., the process of detecting whether each piece of frame data in the image includes the human face region. Details of the index-use face selection process, i.e., the process of determining whether the face image detected should be selected as the index image, will be described later.

Image data obtained by various adjustments in the camera signal processing section 103 is recorded on a recording medium 105 via a recording/reproducing section 104, along with metadata for the image obtained by photographing. This metadata is generated as a result of the face detection process and the index-use face selection process performed by the representative face extraction unit 114. The metadata includes: information about a frame in which a face has been detected; a position and size of a detected face region; and score information, which will be described later, for example.

The recording/reproducing section 104 performs data compression according to a predetermined compression method, and records the data compressed on the recording medium 105. As a system for recording a video signal, high-definition (HD) video recording using MPEG-4 AVC/H.264 compression, a standard-definition (SD) video recording using MPEG-2 compression, or the like is applied, for example. In addition, the recording/reproducing section 104 generates an image information management file (called an AV index file, for example) in which management information for compressed image information is stored, and records the generated image information management file on the recording medium 105.

The metadata for each frame is stored in the image information management file (i.e., the AV index file). As described above, the metadata includes: the information about the frame in which the face has been detected; the position and size of the detected face region; and the score information, which will be described later, for example.

Figure 2:
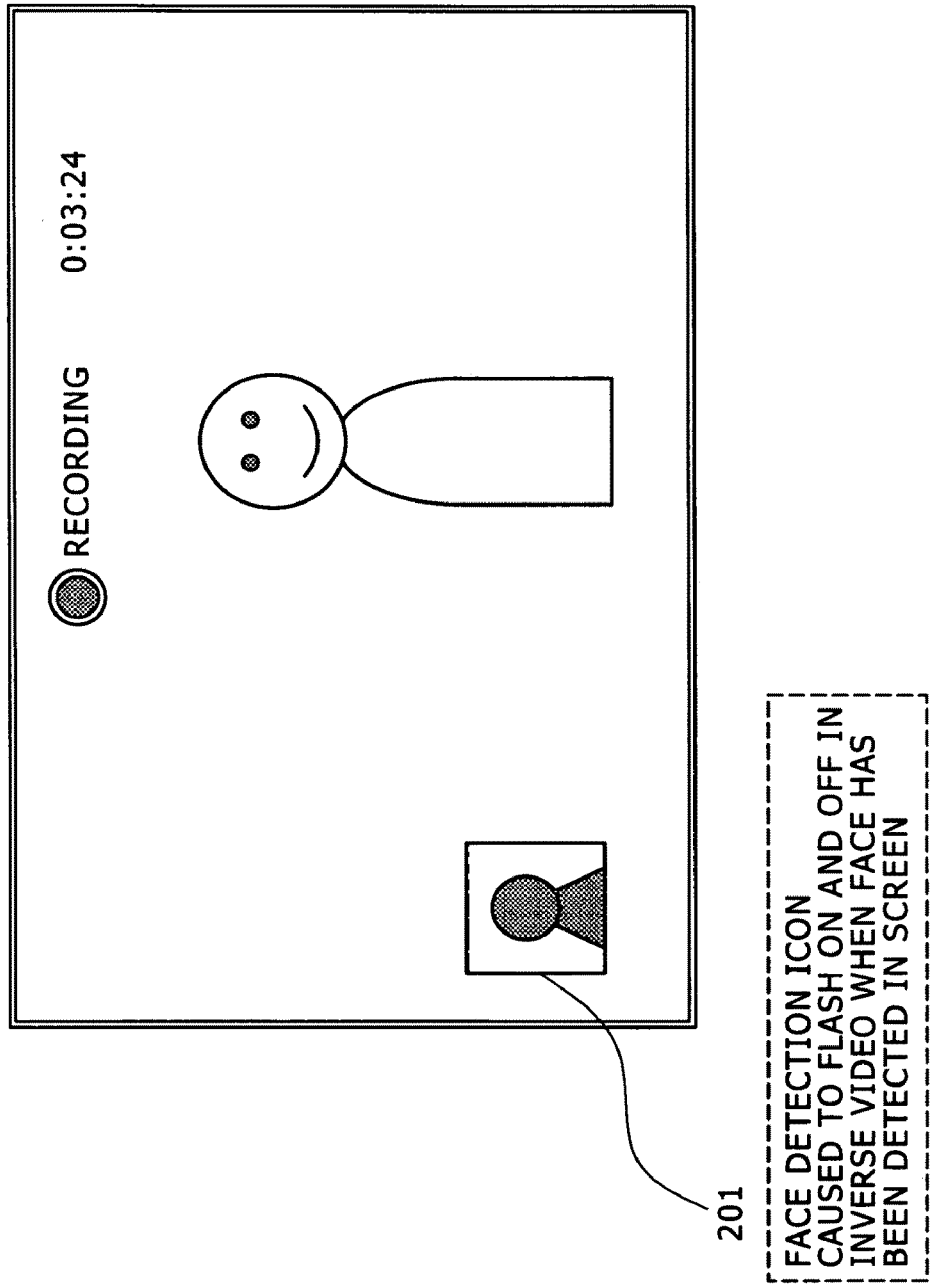
FIG. 2 is a diagram for explaining about an exemplary manner in which a face detection icon is displayed on a display section.

The image obtained by photographing is also outputted to a display section 109 via the recording/reproducing section 104, and the image obtained by photographing is displayed on the display section 109 as a "through image". In the case where the representative face extraction unit 114 in the camera signal processing section 103 has detected a face in a frame obtained by photographing, a face detection icon is displayed on the through image. The face detection icon indicates that the face has been detected. FIG. 2 shows an example of an image obtained by photographing (i.e., a through image) as displayed on the display section 109. The representative face extraction unit 114 in the camera signal processing section 103 performs analysis to determine whether this image obtained by photographing includes the face region, and when a face has been detected by the representative face extraction unit 114, the face detection icon 201, which indicates that the face has been detected, is displayed on the through image. The face detection icon 201 can be displayed in various manners. For example, the face detection icon 201 may be caused to flash on and off in inverse video when the face has been detected in a screen.

Referring back to FIG. 1, the description of the structure of the imaging apparatus proceeds. The microprocessor 110 receives key operation information from the key input section 106, or user operation information from an operation key on a GUI displayed on the display section 109, and performs a process in accordance with a user instruction. The display section 109 is formed by an LCD touch panel, for example, and the GUI may be displayed thereon. Thus, the user operation information can be inputted.

The microprocessor 110 operates while receiving supply of power from a battery 120 or an AC power supply via a power supply circuit 121, and controls various processes performed within the imaging apparatus 100. In addition, the microprocessor 110 controls a power supply control signal as necessary to control supply of power to other circuits. The microprocessor 110 subjects key entry on the key input section 106 or key entry on the GUI displayed on the display section 109 to analog to digital conversion, and judges which key is being pressed based on a resultant digital value. The microprocessor 110 performs various processes in accordance with a result of this judgment. The microprocessor 110 includes a CPU 111, a RAM 112, and a ROM 113, and performs the processes in accordance with a program stored beforehand.

For example, when an instruction for playback has been entered using the key in the key input section 106 or the key on the GUI displayed on the display section 109, the microprocessor 110 causes the imaging apparatus to shift into a video signal reproduction mode, and reads the data recorded on the recording medium 105 via the recording/reproducing section 104, decodes the read data, and supplies the decoded data to the display section 109 via a superimposing section 108, so that the data is displayed on the display section 109.

An on-screen display (OSD) processing section 107 interprets a command inputted from the microprocessor 110, and sends a display signal generated on a VRAM to the superimposing section 108 on a scan-by-scan basis. For example, the on-screen display (OSD) processing section 107 generates data, such as GUI information and manual information, that is different from the video signal and to be displayed so as to be superimposed upon a video, and sends the generated data to the superimposing section 108. The superimposing section 108 superimposes the display signal sent from the on-screen display (OSD) processing section 107 upon a video signal to be recorded or a reproduced video signal, and outputs a resultant signal to the display section 109.

In the imaging apparatus according to the present embodiment, the microprocessor 110 generates a list of thumbnail images of the image data recorded on the recording medium 105 based on a user instruction, and displays the list on the display section 109. At this time, images that include human faces are selected from each of the contents recorded on the recording medium 105, thumbnail images of those selected images, which include the faces, are generated, and these thumbnail images are displayed on the display section 109 in chronological order.

Note that, in FIG. 1, a representative face extraction unit 114', enclosed by a dotted-line frame, is shown within the microprocessor 110. The representative face extraction unit 114' performs similar processes to those of the representative face extraction unit 114 in the camera signal processing section 103. That is, the representative face extraction unit 114, performs the face detection process, i.e., the process of determining whether each image includes the human face region, and the index-use face selection process, i.e., the process of determining whether the face image detected should be selected as the index image. The face detection process and the index-use face selection process may be performed either in the camera signal processing section 103 or in the microprocessor 110. Alternatively, an independent dedicated processor may be provided to perform the face detection process and the index-use face selection process. Presence of the representative face extraction unit 114', enclosed by the dotted-line frame within the microprocessor 110, in FIG. 1 indicates that the representative face extraction unit may be provided within the microprocessor 110, instead of within the camera signal processing section 103.

Further, the microprocessor 110 accepts information about which thumbnail image has been selected by the user from among the chronological thumbnail image data displayed on the display section 109, and performs a process of starting playback of the content with a position of an image corresponding to the selected thumbnail image.

In the imaging apparatus according to the present embodiment, the microprocessor 110 acquires image data of a content specified by the user, for example, from the recording medium 105, extracts, from the acquired image data, frames including face images selected as indices based on analysis of the metadata in the image information management file, cuts out face regions selected as indices from the extracted frames to generate thumbnail face images, and outputs face index images arranged in chronological order to the display section 109. Display data of a list of the chronological thumbnail face images corresponding to one piece of recorded video data will be referred to as a "face index view".

An example of the face index view displayed on the display section 109 will now be described below with reference to FIG. 3. The "face index view" is image data of the chronological list of the thumbnail images (size-reduced images) of the face regions generated based on the metadata obtained as a result of the performance of the face detection process, i.e., the process of detecting whether each piece of frame data in the image taken includes the human face region, and the index-use face selection process, i.e., the process of determining whether the face image detected should be selected and extracted as the index, in the representative face extraction unit 114 in the camera signal processing section 103 or in the representative face extraction unit 114' in the microprocessor 110.

The thumbnail images to be displayed in the face index view are generated by the microprocessor 110 when a request for displaying the face index view has been issued. The thumbnail images generated are temporarily stored in the RAM 112 within the microprocessor 110, and then outputted to the display section 109 to be displayed thereby. The thumbnail images used in the face index view are not recorded on the recording medium 105. Therefore, a recording area in the recording medium is not reduced thereby. The microprocessor 110 acquires the compressed images (e.g., a high-definition (HD) video using MPEG-4 AVC/H.264 compression, a standard-definition (SD) video using MPEG-2 compression, or the like) recorded on the recording medium 105, cuts out intraframe coded images (referred to as I pictures, I frames, or I-VOPs) therefrom, performs a size reduction process thereon, and displays the size-reduced intraframe coded images in order in a face index list area. Details of a method of generating the thumbnail images applied to the face index view will be described later.

A detailed structure of the face index view will now be described below with reference to FIG. 3. The face index view includes a content index display area 301 and a face index display area 302.

The content index display area 301 is an area in which one representative image selected from within one content, which is a unit of recorded video data, is displayed. When either of content index previous/next keys 303a and 303b is operated, a representative image of a different content is presented. The representative image displayed in the content index display area 301 is a thumbnail image of a top picture of the content, for example.

Meanwhile, the face index display area 302 is an area in which is displayed the image data of the list of the thumbnail images (i.e., the size-reduced images) of the faces, i.e., the face regions, cut out from the frames including the face regions selected as the indices based on the metadata obtained as a result of the face detection process and the index-use face selection process performed on the content (i.e., video image data) to which the thumbnail image displayed in the content index display area 301 belongs.

Face index previous/next keys 306a and 306b are displayed in the face index display area 302. When either of the face index previous/next keys 306a and 306b is operated, thumbnail images as face indices corresponding to different times in the same content are displayed. Note that, in the case where a single still image includes a plurality of face image regions, a plurality of face images corresponding thereto are displayed one after another in the face index display area 302.

When either of the content index previous/next keys 303a and 303b in the content index display area 301 has been operated, the face indices displayed in the face index display area 302 are replaced by other face indices corresponding to a new index displayed in the content index display area 301.

Figure 4:
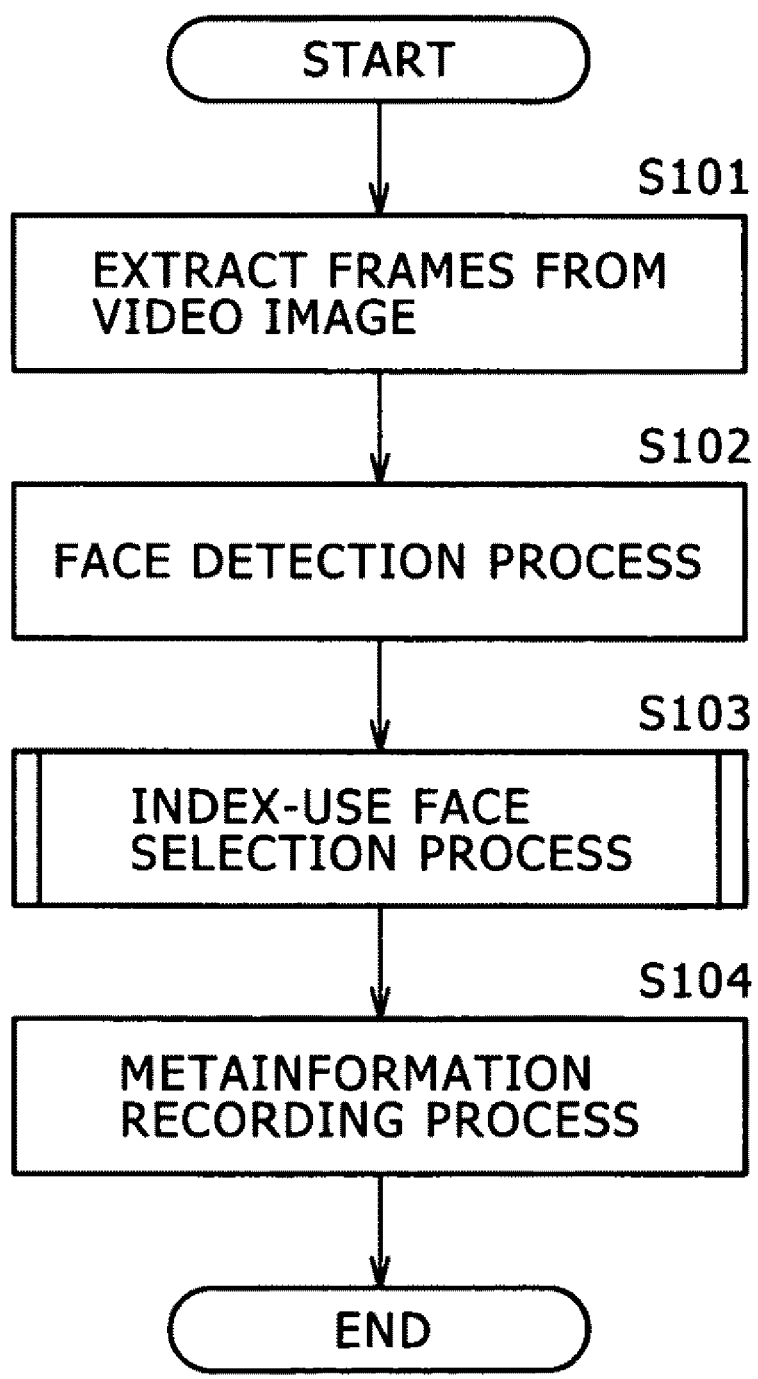
FIG. 4 is a flowchart illustrating a data recording sequence that includes a face detection process and an index-use face selection process performed in the image processing apparatus according to one embodiment of the present invention.

Next, referring to a flowchart of FIG. 4, a procedure performed in the image processing apparatus according to the present embodiment will now be described schematically below. The flowchart of FIG. 4 illustrates a procedure performed in the imaging apparatus as shown in FIG. 1 when taking an image and recording the image taken on the recording medium 105. This flowchart illustrates a sequence of the face detection process, the index-use face selection process, and a process of recording the metadata generated based on the face detection process and the index-use face selection process. The flow of processes as shown in FIG. 4 corresponds to a procedure performed mainly by the representative face extraction unit 114 and the recording/reproducing section 104 under control of the microprocessor 110 as shown in FIG. 1.

Processes of steps as shown in the flowchart of FIG. 4 will now be described below. First, at step S101, the representative face extraction unit 114 extracts, from a video image obtained by photographing, image frames that are to be subjected to face detection. This process of extracting the frames is performed as a process of selecting the frames at regular intervals from among the image taken, for example. The interval of the extraction of the frames can be set in various manners. For example, each frame may be extracted (in this case, all frames are extracted). Alternatively, the frames may be extracted at intervals of several frames, for example.

Figure 5:
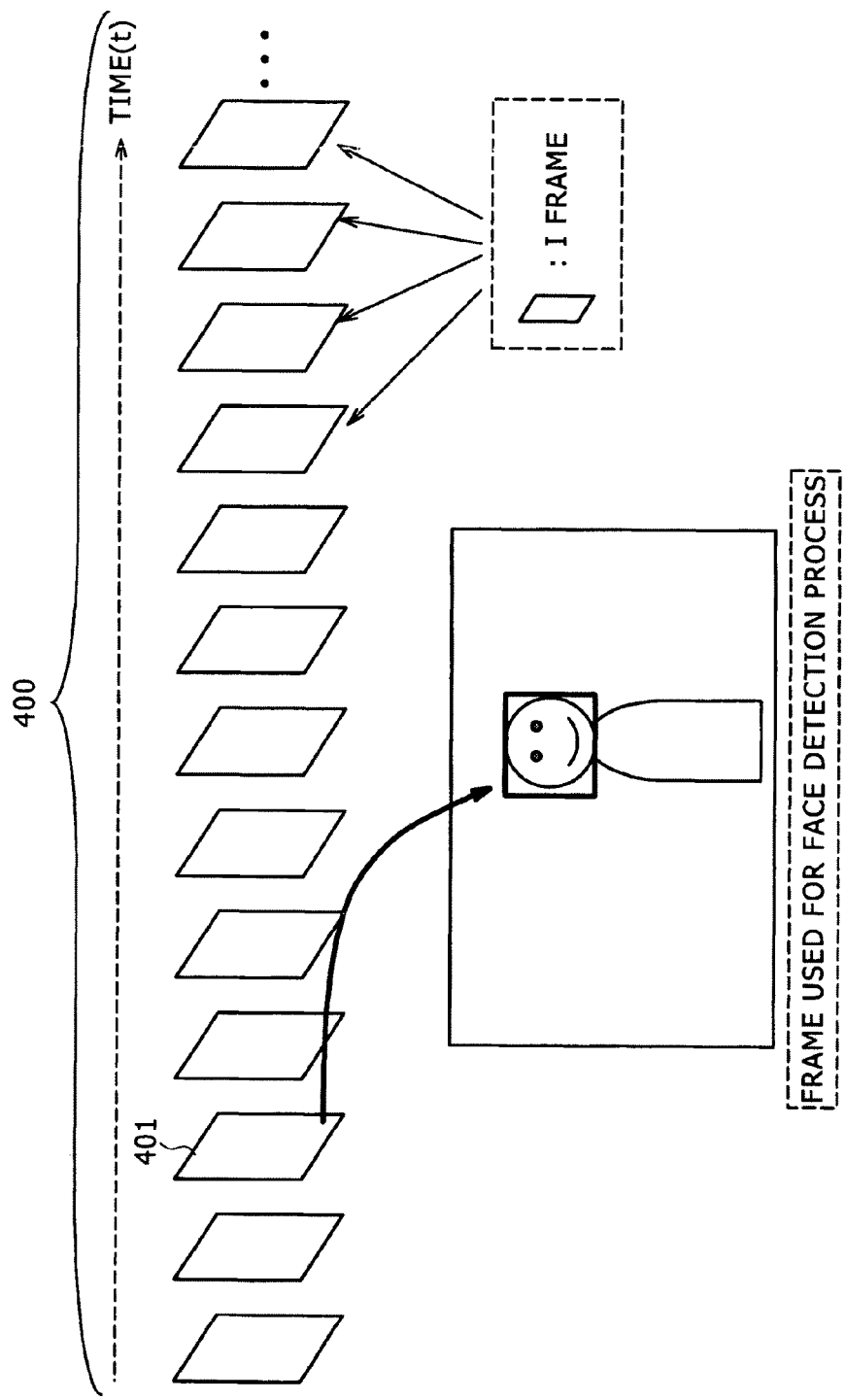
FIG. 5 is a diagram for explaining about an exemplary process of selecting frames to be subjected to the face detection process performed in the image processing apparatus according to one embodiment of the present invention.

Details of the process of extracting the frames at step S101 will now be described below with reference to FIG. 5. In the case where MPEG or AVC is used as a video compression format for the data recorded on the recording medium 105, for example, compressed image data 400 includes different types of frames (pictures) compressed in different manners. Specifically, the compressed image data 400 includes the intraframe coded images (I pictures), B frames (B pictures), and P frames (P pictures). The B frames and the P frames have a smaller data amount than the intraframe coded images. Of these types of coded data, the intraframe coded images can be decoded independently.

Image frames to be subjected to face detection are frames used for selecting the face images to be used for index display. Therefore, it is preferable that frames that facilitate an index display process be selected as the image frames to be subjected to face detection. The intraframe coded images (i.e., the I pictures) are frames that can be decoded with no reference to other images. Therefore, it is preferable that the intraframe coded images (i.e., the I pictures) be selected as selected frames 401. In the case where processing is performed on a GOP basis (e.g., on a 15-frame basis), it is possible to access a desired frame quickly in a playback mode. Therefore, it is preferable that the frames be extracted on a GOP basis. For example, it is preferable that the frames be extracted at intervals of 2 GOPs. It will be appreciated that the frames may be extracted at longer intervals depending on a system performance.

After the image frames to be subjected to face detection are extracted from the video image at step S101, the face detection process is performed at step S102. The face detection process determines whether each of the extracted frames includes any face region. The face detection process can be achieved by a known technique. For example, the face detection process is performed using a technique as described in Japanese Patent Laid-Open No. 2005-157679. In the case where a face has been detected in any of the frames at step S102, a "coordinate position within the frame", a "size", and a "face score evaluation value (indicating the extent of face likeliness)" of each detected face are determined, and these pieces of information are stored in memory.

The "coordinate position within the frame" and the "size" of the face will now be described below with reference to FIG. 6.

Figure 6:
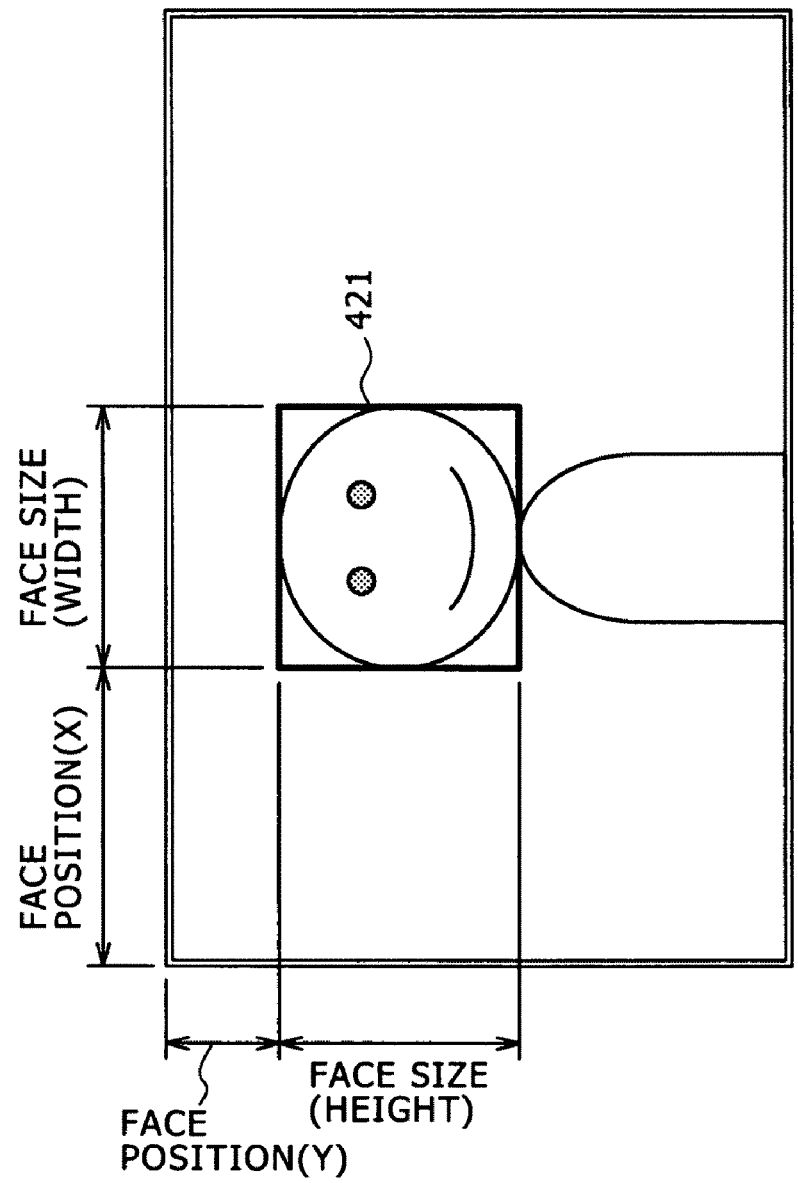
FIG. 6 is a diagram for explaining about metainformation concerning a face detected by the face detection process performed in the image processing apparatus according to one embodiment of the present invention.

Referring to FIG. 6, the "coordinate position within the frame" of the face is calculated as coordinates (X, Y) of an upper-left corner of a face region 421 detected in the frame, with an upper-left corner of the frame for the origin and X and Y for horizontal and vertical directions, respectively.

The "size" of the face is calculated as a width in an X direction and a height in a Y direction of the face region 421 detected in the frame.

The "face score evaluation value (indicating the extent of face likeliness)" is an evaluation value indicating the extent of human face likeliness in face detection performed using the technique as described in Japanese Patent Laid-Open No. 2005-157679, for example. When there is a large characteristic quantity of a human face, the face score evaluation value becomes high, while when there is a small characteristic quantity of the human face, the face score evaluation value becomes low. Details of the process of calculating this evaluation value are described in Japanese Patent Laid-Open No. 2005-157679. In the present embodiment, the technique as disclosed therein is applied when calculating the face score evaluation value (indicating the extent of face likeliness).

Next, at step S103, the index-use face selection process is performed. As described above, the face detection is performed on the selected frames, such as the intraframe coded images (i.e., the I pictures), at step S102. It is not reasonable that all faces detected be set as the index images. In the case of a video image obtained by photographing people mostly, faces are detected in most frames. If all such faces are set as the index images, an enormous number of index face images will be set, so that the index face images will be useless as indices.

Accordingly, at step S103, the process of selecting a face image to be used as an index from among the face images detected at step S102 is performed. The process of step S103 is performed with respect to each frame in which at least one face has been detected by the processes of steps S101 and S102. Specifically, a score is calculated with respect to each face detected, and a face that has a high score is selected as an index face. One example of the process of step S103 will now be described in detail below with reference to a flowchart of FIG. 7.

Figure 7:
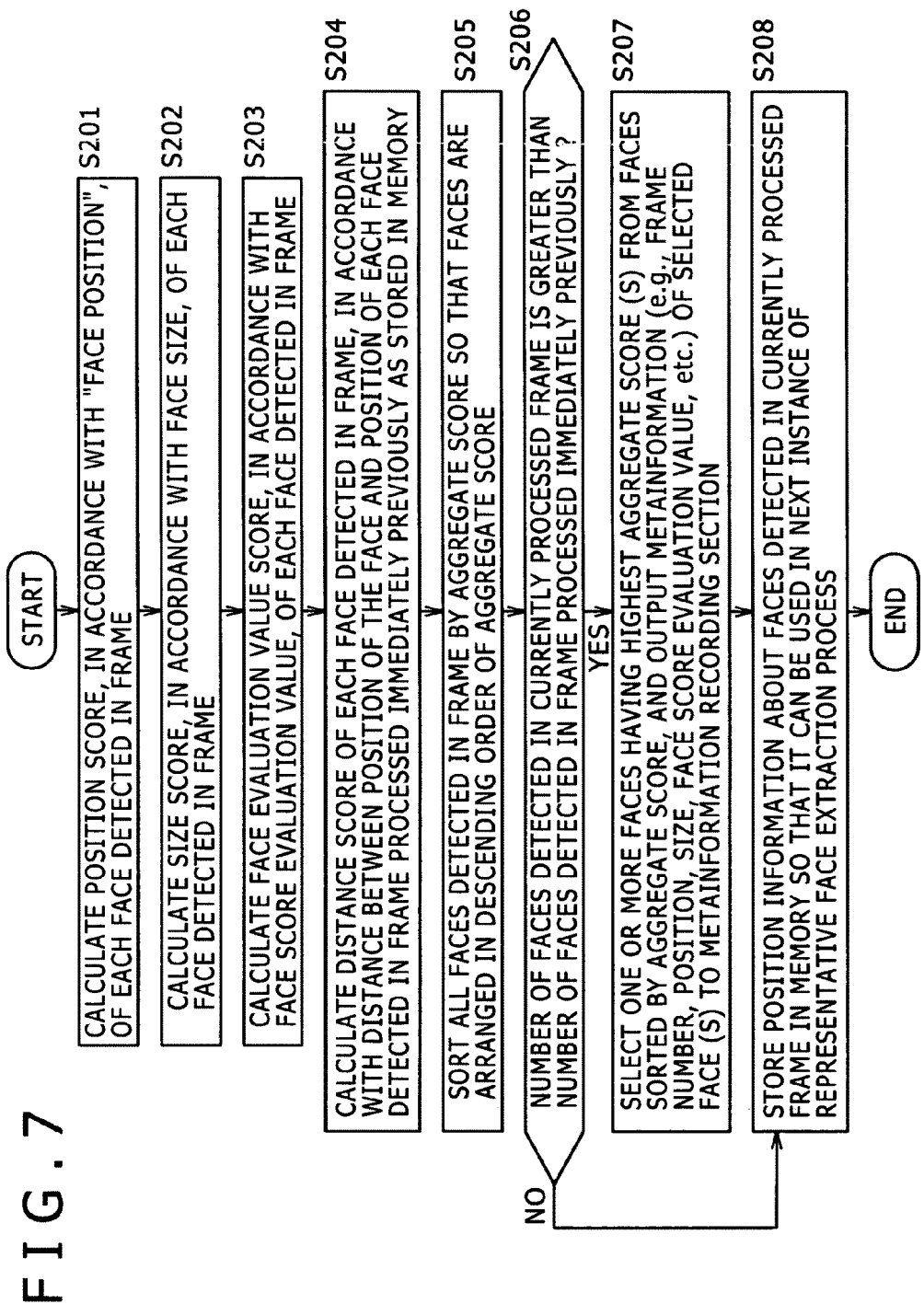
FIG. 7 is a flowchart illustrating an index face selection sequence performed in the image processing apparatus according to one embodiment of the present invention.

The flowchart of FIG. 7 illustrates a procedure performed with respect to each frame in which the face has been detected by the processes of steps S101 and S102 as shown in FIG. 4. That is, processes of steps S201 to S208 are performed sequentially with respect to each of the frames in which the face has been detected. Hereinafter, the frames in which the face has been detected will be referred to as "face-detected frames" as appropriate.

First, at step S201, a position score, in accordance with a "face position", of each face detected at step S102 is calculated. The position score is calculated with respect to each face detected in each face-detected frame that is to be subjected to processing. In the case where a plurality of faces have been detected, the position score is calculated with respect to each of the plurality of faces.

The position score increases in value as the position of the corresponding face detected becomes closer to the center of the frame. The position score decreases in value as the position of the corresponding face detected becomes more distant from the center of the frame.

Specifically, an area of the frame may be divided into two areas, for example, a central area and a peripheral area:

The position score of a face detected in the central area may be set at: the position score=100.

The position score of a face detected in the peripheral area may be set at: the position score=0.

In such a manner, the area of the frame may be divided into multiple areas, and different values of the position score may be assigned to those areas. Such digital score setting is possible. Analog score setting is also possible. For example, the position score may decrease gradually in value as the position of the corresponding face departs from the center of the frame.

Next, at step S202, a size score, in accordance with a "face size", of each face detected at step S102 is calculated. The size score is calculated with respect to each face detected in each face-detected frame that is to be subjected to processing. In the case where a plurality of faces have been detected, the size score is calculated with respect to each of the plurality of faces.

The size score increases in value as the size of the corresponding face detected increases. The size score decreases in value as the size of the corresponding face detected decreases.

Specifically, a specific threshold size may be set, for example:

The size score of a face whose size is equal to or greater than the threshold size may be set at: the size score=100.

The size score of a face whose size is smaller than the threshold size may be set at: The size score=0.

In such a manner, all sizes may be classified into multiple groups, and different values of the size score may be assigned to those size groups. Such digital score setting is possible. Analog score setting is also possible. For example, the size score may decrease gradually in value as the size of the corresponding face decreases.

Next, at step S203, a face evaluation value score, in accordance with the "face score evaluation value (indicating the extent of face likeliness)", of each face detected at step S102 is calculated. The face evaluation value score is calculated with respect to each face detected in each face-detected frame that is to be subjected to processing. In the case where a plurality of faces have been detected, the face evaluation value score is calculated with respect to each of the plurality of faces.

As described above, "the face score evaluation value (indicating the extent of face likeliness)" is described in Japanese Patent Laid-Open No. 2005-157679, for example. When there is a large characteristic quantity of a human face, the face score evaluation value becomes high, while when there is a small characteristic quantity of the human face, the face score evaluation value becomes low. The face evaluation value score is set in accordance with the face score evaluation value. The face evaluation value score increases in value as the face score evaluation value of the corresponding face detected increases, while the face evaluation value score decreases in value as the face score evaluation value of the corresponding face detected decreases.

Specifically, a specific threshold may be set, for example:

The face evaluation value score of a face having a face score evaluation value equal to or greater than the threshold may be set at: the face evaluation value score=100.

The face evaluation value score of a face having a face score evaluation value lower than the threshold may be set at: the face evaluation value score=0.

In such a manner, all evaluation values may be classified into multiple groups, and different values of the face evaluation value score may be assigned to those groups. Such digital score setting is possible. Analog score setting is also possible. For example, the face evaluation value score may decrease gradually in value as the face score evaluation value decreases.

Next, at step S204, a "distance score" of each face detected at step S102 is calculated. The distance score is calculated with respect to each face detected in each face-detected frame that is to be subjected to processing. In the case where a plurality of faces have been detected, the distance score is calculated with respect to each of the plurality of faces.

Figure 8:
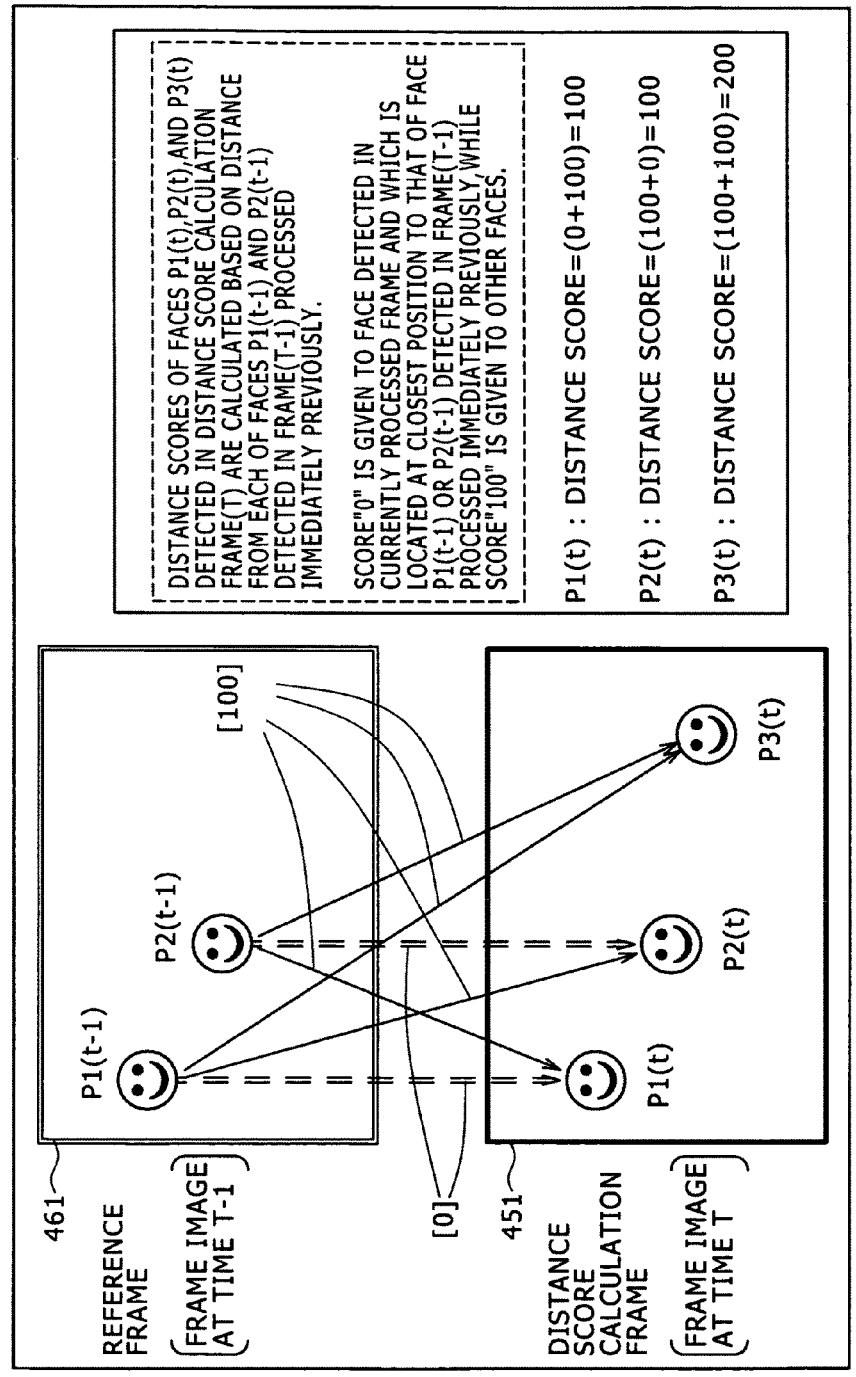
FIG. 8 is a diagram for explaining about details of a process of calculating a distance score in the index face selection sequence performed in the image processing apparatus according to one embodiment of the present invention.

The distance score will now be described below with reference to FIG. 8. A distance score calculation frame 451 as shown in FIG. 8 is a frame that is to be subjected to distance score calculation. The distance score calculation frame 451 is a frame in which faces have been detected at step S102 in the flowchart of FIG. 4.

The distance score calculation frame 451 as shown in FIG. 8 is a frame image at time T. Three faces $P1(t)$, $P2(t)$, and $P3(t)$ have been detected in the distance score calculation frame 451. The distance score will be calculated with respect to each of the three faces.

The distance scores of the faces $P1(t)$, $P2(t)$, and $P3(t)$ detected in the distance score calculation frame (T) are calculated with reference to faces $P1(t-1)$ and $P2(t-1)$ detected in a frame (T-1), i.e., a reference frame 461 as shown in FIG. 8. The reference frame 461 is a frame at time T-1, which is a frame immediately previous to the distance score calculation frame 451 at time T and which has been subjected to face detection at step S102 in the flowchart of FIG. 4.

The distance score of each of the faces $P1(t)$, $P2(t)$, and $P3(t)$ detected in the distance score calculation frame (T) is calculated based on a distance from each of the faces $P1(t-1)$ and $P2(t-1)$ detected in the frame (T-1), which has been processed at the immediately previous point in time.

For example, the distance score is calculated while a score "0" is given to a face detected in the currently processed frame and which is located at the closest position to that of the face $P1(t-1)$ or $P2(t-1)$ detected in the frame (T-1) processed immediately previously and a score "100" is given to the other faces.

For example, the distance score of the face $P1(t)$ in the distance score calculation frame 451 is:

$P1(t)$: the distance score=(0+100)=100.

The first term "0" in (0+100) corresponds to the score "0" which is set based on the condition that the face $P1(t)$ in the distance score calculation frame 451 is located at the closest position to that of the face $P1(t-1)$ detected in the reference frame 461, i.e., the frame (T-1), which has been processed at the immediately previous point in time. The second term "100" in (0+100) corresponds to the score "100", which is set based on the condition that the face $P1(t)$ in the distance score calculation frame 451 is not located at the closest position to that of the face $P2(t-1)$ detected in the reference frame 461, i.e., the frame (T-1). The distance score of the face $P1(t)$ in the distance score calculation frame 451 is calculated by adding these scores "0" and "100" together, and thus the distance score of the face $P1(t)$ is (0+100)=100.

The distance score of the face $P2(t)$ in the distance score calculation frame 451 is:

$P2(t)$: the distance score=(100+0)=100.

The first term "100" in (100+0) corresponds to the score "100", which is set based on the condition that the face $P2(t)$ in the distance score calculation frame 451 is not located at the closest position to that of the face $P1(t-1)$ detected in the reference frame 461, i.e., the frame (T-1). The second term "0" in (100+0) corresponds to the score "0", which is set based on the condition that the face $P2(t)$ in the distance score calculation frame 451 is located at the closest position to that of the face $P2(t-1)$ detected in the reference frame 461, i.e., the frame (T-1). The distance score of the face $P2(t)$ in the distance score calculation frame 451 is calculated by adding these scores "100" and "0"together:

$P2(t)$: the distance score=(100+0)=100.

The distance score of the face $P3(t)$ in the distance score calculation frame 451 is:

$P3(t)$: the distance score=(100+100)=200.

The first term "100" in (100+100) corresponds to the score "100", which is set based on the condition that the face $P3(t)$ in the distance score calculation frame 451 is not located at the closest position to that of the face $P1(t-1)$ detected in the reference frame 461, i.e., the frame (T-1). The second term "100" in (100+100) corresponds to the score "100", which is set based on the condition that the face $P3(t)$ in the distance score calculation frame 451 is not located at the closest position to that of the face $P2(t-1)$ detected in the reference frame 461, i.e., the frame (T-1). The distance score of the face $P3(t)$ in the distance score calculation frame 451 is calculated by adding these scores "100" and "100" together:

$P3(t)$: the distance score=(100+100)=200.

As described above, the distance score of each face detected in the distance score calculation frame 451 is set in accordance with the distance from each face detected in the reference frame. This is because faces that are located at the same position are very likely to be faces of the same person, because it is not desirable that a plurality of faces of the same person be adopted as indices, and because there is a desire to adopt faces of different people as indices, if possible.

In the exemplary process of calculating the distance score as described above with reference to FIG. 8, the distance score "0" is given to the face detected in the distance score calculation frame 451 and which is located at the closest position to that of any face detected in the reference frame, and the score "100" is given to the other faces. Such a digital manner of score setting is simply an example and not essential to the present invention. An analog manner of score setting is also applicable. For example, a face detected in the distance score calculation frame 451 and which corresponds in position to any face detected in the reference frame may be given a low score, while progressively higher scores may be given thereto as it departs from the face in the reference frame.

Next, at step S205, an aggregate score is calculated based on the four types of scores calculated at steps S201 to S204: (a) the position score; (b) the size score; (c) the face evaluation value score; and (d) the distance score. In addition, the faces are sorted by aggregate score so that the faces are arranged in descending order of the aggregate score. The aggregate score is calculated with respect to each face detected in each face-detected frame that is to be subjected to processing, and such faces are sorted in the above-described manner. When calculating the aggregate score, the above four types of scores are added together while assigning weighting parameters to those scores, for example:

Specifically, assume in the following:
(a) the position score=Sa;
(b) the size score=Sb;
(c) the face evaluation value score=Sc; and
(d) the distance score=Sd.

Also, assume that weighting parameters p, q, r, and s are set for the above scores. Then, the aggregate score [Sa11] is calculated by the following equation:

the aggregate score $[Sa11]=p(Sa)+q(Sb)+r(Sc)+s(Sd)$.

Note that each of the weighting parameters may be "1". The weighting parameters can be set in various manners. For example, the weighting parameter for the distance score may be set at a large value.

As described above, at step S205, the aggregate score of each face detected in each face-detected frame that is to be subjected to processing is calculated based on (a) the position score, (b) the size score, (c) the face evaluation value score, and (d) the distance score, and the faces are sorted by aggregate score so that the faces are arranged in descending order of the aggregate score.

At step S206, the number of faces detected in the currently processed frame, i.e., the frame that has just been subjected to the processes of calculating the above four types of scores and the aggregate score, is compared with the number of faces detected in the frame processed immediately previously, which has been selected at step S101 in the flowchart of FIG. 4 as a frame to be processed, to determine whether the number of faces detected in the currently processed frame is greater than the number of faces detected in the frame processed immediately previously. If the determination is positive, control proceeds to step S207. If the determination is negative, control proceeds to step S208.

At step S207, of the faces that have been detected in the currently processed frame and sorted by aggregate score, one or more faces that have the highest aggregate score(s) are selected as the index face(s), and metainformation (e.g., a frame number, the position, the size, the face evaluation value score, the aggregate score, etc.) of the selected face(s) is outputted to a metainformation recording section. Thereafter, a process of step S104 as shown in FIG. 4, i.e., a metainformation recording process, is performed. That is, the face(s) selected from among the currently processed frame based on the order of the aggregate scores are chosen as the index face(s) (i.e., representative faces) at step S207, and the metainformation of the index face(s) is recorded on the recording medium 105 (see FIG. 1). Faces that have a low aggregate score and accordingly have not been selected at step S207 are not set as indices.

Note that the number of faces that should be selected from among one frame as the index faces (i.e., the representative faces) is set beforehand. This number may be set by the user. In this case, the user inputs a number beforehand, and this number of faces is selected as the index face in accordance with the order of the aggregate scores.

If it is determined at step S206 that the number of faces detected in the currently processed frame is not greater than the number of faces detected in the frame processed immediately previously, control proceeds to step S208 without the process of step S207 being performed. Therefore, in the case where the number of faces detected in the currently processed frame is not greater than the number of faces detected in the frame processed immediately previously, no faces detected in the currently processed frame are selected as the index faces.

At step S208, position information concerning the faces detected in the currently processed face-detected frame is recorded on the memory. This information will be used when this frame is referred to as a reference frame (i.e., the reference frame 461 as shown in FIG. 8) when calculating the distance score at step S204.

As described above, the index-use face selection process at step S103 in the flowchart of FIG. 4 is performed in accordance with the flowchart of FIG. 7, for example, and the face image to be used as the index is selected from the face images detected at step S102. At step S104, the metainformation for the face selected in the index-use face selection process at step S103, i.e., the frame number, the position, the size, the face evaluation value score, the aggregate score, and the like corresponding to the face selected as the index, is recorded on the recording medium 105 (see FIG. 1) as the metainformation for the index face.

As described above, in the apparatus according to the present embodiment, the frames (e.g., the intraframe coded images (i.e., the I pictures)) selected from the frames that constitute the video image are subjected to face detection, and the frames in which the faces have been detected are subjected to the index-use face selection process as illustrated in FIG. 7. That is, the four types of scores (i.e., (a) the position score, (b) the size score, (c) the face evaluation value score, and (d) the distance score), and then the aggregate score, of each detected face are calculated, then the detected faces are sorted by aggregate score so that the faces are arranged in descending order of the aggregate score, and then only faces that have a high aggregate score are selected as index-use faces. Moreover, the number of faces detected in the currently processed face-detected frame is compared with the number of faces detected in the frame processed immediately previously, and when the number of faces detected in the currently processed frame is greater than the number of faces detected in the frame processed immediately previously, the faces detected in the currently processed frame are set as candidates for the indices. Accordingly, the number of indices generated is limited to a reasonable number. For example, suppose the case where the number of faces detected is identical in many consecutive frames, such as the case where the same person or people are continuously photographed. In such a case, faces that are detected in frames involving new appearance or reappearance of the faces (i.e., people) are registered as the indices, while the same person who continuously appears in consecutive frames is not set as multiple indices.

The metainformation for the face selected as the index face is recorded on the recording medium 105 (see FIG. 1) at step S104 in the flowchart of FIG. 4. As described above, this metainformation includes the frame number, the position, the size, the face evaluation value score, and the aggregate score corresponding to the face selected as the index.

An exemplary data structure of specific metadata will now be described below with reference to FIG. 9. The metadata is stored in a face information management file, which is a data component of the image information management file (i.e., the AV index file), which is recorded on the recording medium 105 (see FIG. 1) so as to be associated with the corresponding image data, which is also recorded on the recording medium 105, for example. As shown in FIG. 9A, the face information management file includes an aggregation of pieces of metadata for the index faces (i.e., the representative faces) selected as the index-use faces. Each piece of metadata, corresponding to a separate face, has a data structure as shown in FIG. 9B.

That is, each piece of metadata includes: time information (higher-order 4 bytes and lower-order 4 bytes) of the face-detected frame corresponding to the frame number for the face (i.e., the representative face) selected as the index; position information concerning the position in the frame of the face (4 bytes); size information concerning the size of the face (4 bytes); the face evaluation value score (4 bytes); and the aggregate score (4 bytes). Note that the position information concerning the position in the frame of the face and the size information concerning the size of the face correspond to the data as described above with reference to FIG. 6. Also note that the structure of the metadata as shown in FIG. 9B is simply an example. The face evaluation value score (4 bytes) and the aggregate score (4 bytes) may be omitted, for example.

Figure 3:
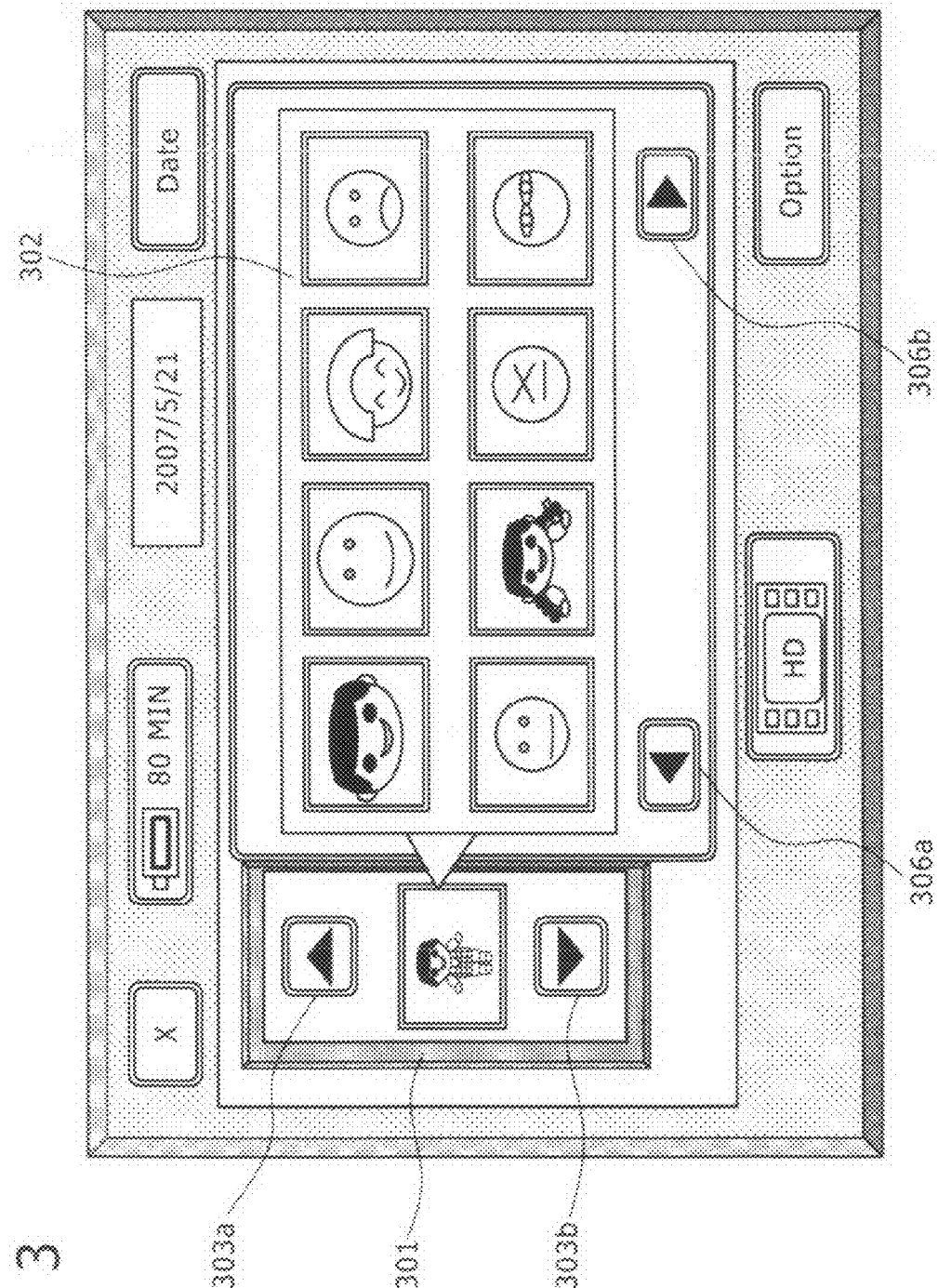
FIG. 3 is a diagram for explaining about an example of a face index view displayed on the display section.

When the indices are actually displayed, the metadata is used to select appropriate frames, acquire information concerning the face regions, and cut out the face regions from the frames, and the face indices are displayed in such a manner as shown in FIG. 3. In the case where the metadata includes the face evaluation value score (4 bytes) or the aggregate score (4 bytes), for example, a process of selectively displaying only index faces having a high aggregate evaluation value or control of selectively displaying only index faces having a high face evaluation value score can be performed at the time of the index display process.

In the index-use face selection process as described above with reference to the flowchart of FIG. 7, the index faces (i.e., the representative faces) are selected based on the score information (i.e., (a) the position score, (b) the size score, (c) the face evaluation value score, and (d) the distance score) of each detected face. In other embodiments of the present invention, however, the index faces (i.e., the representative faces) may be selected based on other criteria, using other types of information.

Hereinafter, (1) an exemplary procedure of selecting the index faces using personal identification information, (2) an exemplary procedure of selecting the index faces using smile detection information, and (3) an exemplary procedure of selecting the index faces using child face detection information will be described with reference to flowcharts of FIGS. 10, 11, and 12, respectively. The flowcharts of FIGS. 10, 11, and 12 correspond to the flowchart of FIG. 7 described above, and illustrate variations of the index-use face selection process at step S103 in the flowchart of FIG. 4. Each of the above procedures is performed with respect to the frames in which a face has been detected.

(1) Exemplary Procedure of Selecting the Index Faces Using the Personal Identification Information First, the exemplary procedure of selecting the index faces using the personal identification information will now be described below with reference to FIG. 10. In this exemplary procedure, each detected face is identified. In the above-described embodiment, i.e., in the procedure of selecting the index faces as described above with reference to FIG. 7, each detected face is not identified to determine whether two different faces detected belong to the same individual or different individuals. In the present exemplary procedure, each detected face is identified, and when a face of an individual different from those whose faces have been selected from among a past frame as the index faces has been detected, the face of that different individual is preferentially selected as the index.

The present exemplary procedure will now be described below with reference to the flowchart of FIG. 10, illustrating the procedure of selecting the index faces. As noted previously, the flowchart of FIG. 10 corresponds to the flowchart of FIG. 7 described above, and illustrates the index-use face selection process at step S103 in the flowchart of FIG. 4. The procedure as shown in FIG. 10 is performed with respect to each frame in which a face has been detected.

First, at step S301, all faces that have been detected in the currently processed frame are identified to determine whether each of the detected faces is identical to any face detected in a frame processed immediately previously, and all the faces detected in the currently processed frame are classified into a group of faces that can be clearly determined to be identical to any of the faces detected in the frame processed immediately previously and a group of the other faces. That is, (a) each face detected in the currently processed frame and (b) each face detected in the face-detected frame processed previously are identified, and it is determined whether the faces detected in the currently processed frame includes a face of an individual whose face has not been detected in the face-detected frame processed previously. Note that a so-called personal identification process of determining whether two different detected faces belong to the same individual can be performed by comparing characteristic quantities of the face images obtained in the face detection process with each other. For example, a technique as disclosed in Japanese Patent Laid-Open No. Hei 7-128031, which discloses a face image recognition process, a technique as disclosed in a paper titled "Learning by Detector of Real-time Face in Arbitrary Posture Using Pixel Difference Characteristic", Proceedings of 10th Symposium on Sensing via Image Information, pp. 547 to 552, 2004, and the like may be applied to perform the personal identification process.

At step S302, it is determined whether the currently processed frame includes a face different from any face detected in the frame processed immediately previously. In the case where the currently processed frame includes a face that may not be determined to be clearly identical to any of the faces detected in the frame processed immediately previously, control proceeds to step S303, and a process of selecting the index face is performed. Meanwhile, in the case where the currently processed frame does not include a face that may not be determined to be clearly identical to any of the faces detected in the frame processed immediately previously, control proceeds to step S308 without the process of selecting the index face being performed.

Processes of steps S303 to S305 correspond to the processes of steps S201 to S203 as described above with reference to FIG. 7. That is, (a) the position score, (b) the size score, and (c) the face evaluation value score of a face that is presumed to be a face of a new individual are calculated.

At step S306, the aggregate score is calculated based on the above three types of scores, and the faces are sorted by aggregate score so that the faces are arranged in descending order of the aggregate score. That is, the aggregate score is calculated with respect to each of the faces that are presumed to be different from any face detected in the face-detected frame processed immediately previously, and the faces are sorted by aggregate score. Note that, when calculating the aggregate score, the above three types of scores are added together while weighting parameters are assigned to those scores, for example, as in the above-described procedure:

Specifically, assume in the following:
(a) the position score=Sa;
(b) the size score=Sb; and
(c) the face evaluation value score=Sc.

Also, assume that weighting parameters p, q, and r are set for the above scores. Then, the aggregate score [Sa11] is calculated by the following equation:

the aggregate score $[Sa11]=p(Sa)+q(Sb)+r(Sc)$.

At step S307, of all the faces that have been sorted by aggregate score, one or more faces that have the highest aggregate score(s) are selected as the index face(s), and metainformation (e.g., the frame number, the position, the size, the face evaluation value score, the aggregate score, etc.) of the selected face(s) is outputted to the metainformation recording section. After this process, the process of step S104 as shown in FIG. 4, i.e., the metainformation recording process, is performed.

At step S308, information concerning the face images in the currently processed face-detected frame is recorded on the memory. This information will be used when those face images are referred to in a next instance of the personal identification process at step S301 performed on a next frame to be processed.

In the present exemplary procedure, the personal identification process is performed to determine whether two different faces detected belong to the same individual or to different individuals, and when a face of an individual different from those whose faces have been selected from among the past frame as the index faces has been detected, the face of that different individual is preferentially selected as the index. Therefore, in the case of video image data in which a plurality of individuals appear, it is possible to set the index faces in accordance with timing of appearance of each individual.

(2) Exemplary Procedure of Selecting the Index Faces Using Smile Detection Information Next, the exemplary procedure of selecting the index faces using the smile detection information will now be described below with reference to FIG. 11. In this exemplary procedure, it is determined whether each face detected is a smiling face or not, and when the face detected is a smiling face, it is preferentially selected as the index.

Figure 11:
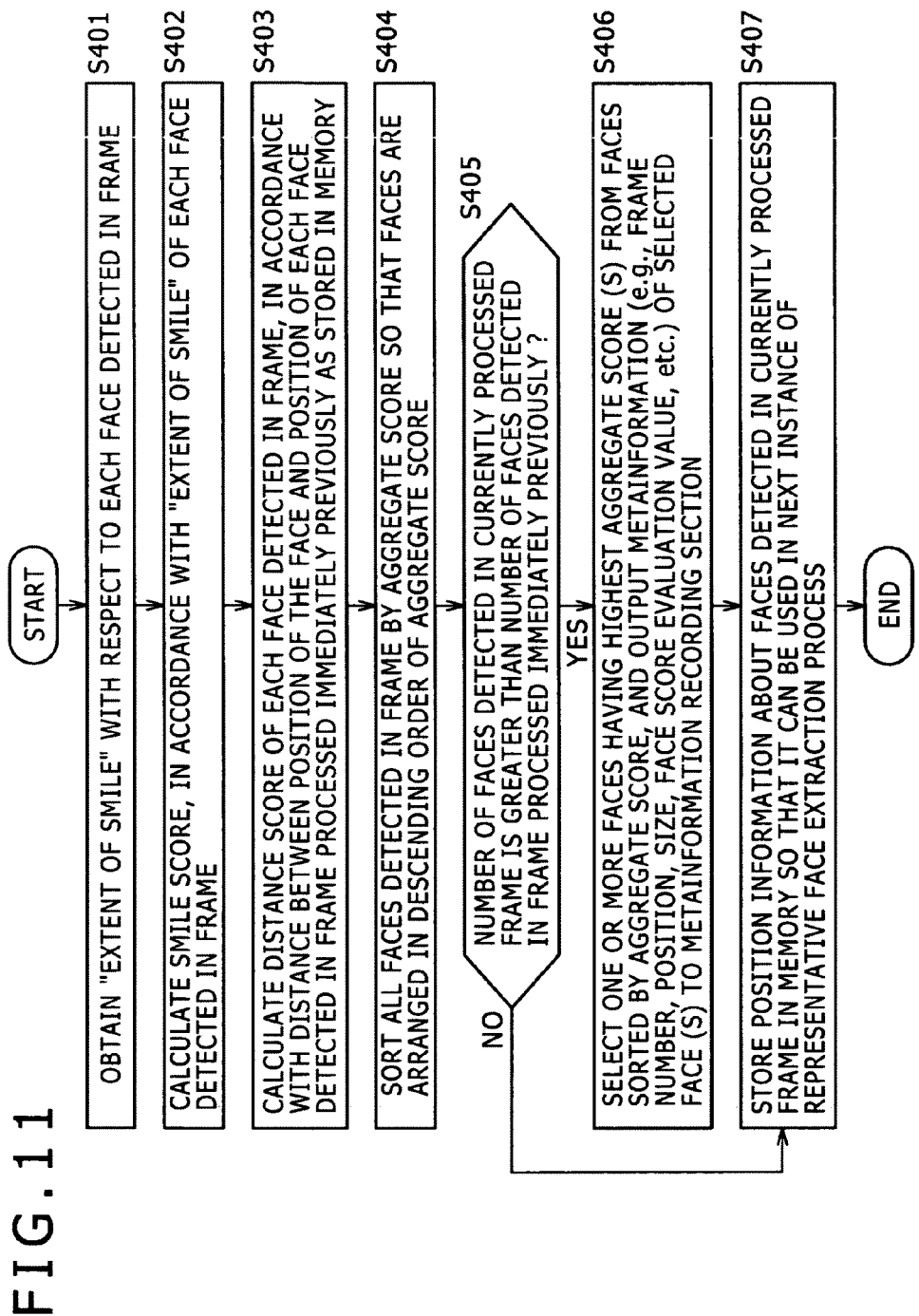
FIG. 11 is a flowchart illustrating an index face selection sequence that involves smile recognition, performed in the image processing apparatus according to one embodiment of the present invention.

The present exemplary procedure will now be described below with reference to a flowchart of FIG. 11, illustrating the procedure of selecting the index faces. As noted previously, the flowchart as shown in FIG. 11 corresponds to the flowchart of FIG. 7 described above, and illustrates the index-use face selection process at step S103 in the flowchart of FIG. 4. The procedure as shown in FIG. 11 is performed with respect to each frame in which a face has been detected.

First, at step S401, the "extent of smile" of each face detected in a frame currently processed is obtained. At step S402, a smile score, i.e., a score in accordance with the "extent of smile", of each face is calculated. The "extent of smile" can be calculated based on characteristic quantities of the face image, which are obtained at the time of the face detection process. For example, the technique as disclosed in Japanese Patent Laid-Open No. Hei 7-128031, which discloses the face image recognition process, the technique as disclosed in the paper titled "Learning by Detector of Real-time Face in Arbitrary Posture Using Pixel Difference Characteristic", Proceedings of 10th Symposium on Sensing via Image Information, pp. 547 to 552, 2004, and the like may be applied therefor.

The smile score increases in value as the "extent of smile" of the corresponding face detected increases, while the smile score decreases in value as the "extent of smile" of the corresponding face detected decreases.

Specifically, a specific threshold may be set with respect to numerical values that represent the "extent of smile", for example:

The smile score of a face whose "extent of smile" is equal to or above the threshold may be set at: smile score=100.

The smile score of a face whose "extent of smile" is below the threshold may be set: smile score=0.

As in the above example, the smile score may be set in a digital manner. Analog score setting is also possible. For example, the smile score may decrease gradually in value in accordance with the numerical value that represents the extent of smile.

Processes of steps S403 to S407 correspond to the processes of steps S204 to S208 described above with reference to FIG. 7. Specifically, in the present exemplary procedure, (a) the smile score and (b) the distance score are calculated at steps S402 and S403, respectively, and at step S404, the aggregate score is calculated based on these two types of scores, and the faces are sorted by aggregate score so that the faces are arranged in descending order of the aggregate score. The distance score is calculated in the same manner as that described above with reference to FIG. 8.

The aggregate score is calculated in the same manner as in the above-described exemplary procedure. For example, the aggregate score is calculated by adding the above different types of scores together while assigning weighting parameters to those scores. Specifically, assume in the following:

(a) the smile score=Sa; and
(b) the distance score=Sb.

Also, assume that weighting parameters p and q are set for the above scores. Then, the aggregate score [Sa11] is calculated by the following equation:

the aggregate score $[Sa11]=p(Sa)+q(Sb)$.

At step S405, the number of faces detected in the currently processed frame, i.e., the frame that has just been subjected to the processes of calculating the above two types of scores and the aggregate score, is compared with the number of faces detected in the frame processed immediately previously, which has been selected at step S101 in the flowchart of FIG. 4 as a frame to be processed, to determine whether the number of faces detected in the currently processed frame is greater than the number of faces detected in the frame processed immediately previously. If the determination is positive, control proceeds to step S406. If the determination is negative, control proceeds to step S407.

At step S406, of the faces that have been sorted by aggregate score, one or more faces that have the highest aggregate score(s) are selected as the index face(s), and metainformation (e.g., the frame number, the position, the size, the face evaluation value score, the aggregate score, etc.) of the selected face(s) is outputted to the metainformation recording section. Thereafter, the process of step S104 as shown in FIG. 4, i.e., the metainformation recording process, is performed.

At step S407, position information concerning the faces detected in the currently processed face-detected frame is recorded on the memory. This information will be used when this frame is referred to as the reference frame (i.e., the reference frame 461 as shown in FIG. 8) when calculating the distance score at step S403.

In the present exemplary procedure, the process of calculating the extent of smile of each detected face is performed, and a higher score is given to a face having a higher extent of smile, so that the face having a higher extent of smile will be preferentially selected as the index. Therefore, when faces detected have various facial expressions, smiling faces are preferentially selected and set as the indices.

(3) Exemplary Procedure of Selecting the Index Faces Using Child Face Detection Information Next, the exemplary procedure of selecting the index faces using the child face detection information will now be described below with reference to FIG. 12. In this exemplary procedure, it is determined whether each face detected is a child face or not, and when the face detected is a child face, it is preferentially selected as the index.

The present exemplary procedure will now be described below with reference to a flowchart of FIG. 12, illustrating the procedure of selecting the index faces. As noted previously, the flowchart as shown in FIG. 12 corresponds to the flowchart of FIG. 7 described above, and illustrates the index-use face selection process at step S103 in the flowchart of FIG. 4. The procedure as shown in FIG. 12 is performed with respect to each frame in which a face has been detected.

First, at step S501, the "extent of child face" of each face detected in a frame currently processed is obtained. At step S502, a child face score, i.e., a score in accordance with the "extent of child face", of each face is calculated. The "extent of child face" can be calculated based on the characteristic quantities of the face image, which are obtained at the time of the face detection process. For example, the technique as disclosed in Japanese Patent Laid-Open No. Hei 7-128031, which discloses the face image recognition process, the technique as disclosed in the paper titled "Learning by Detector of Real-time Face in Arbitrary Posture Using Pixel Difference Characteristic", Proceedings of 10th Symposium on Sensing via Image Information, pp. 547 to 552, 2004, and the like may be applied therefor.

The child face score increases in value as the "extent of child face" of the corresponding face detected increases, while the child face score decreases in value as the "extent of child face" of the corresponding face detected decreases.

Specifically, a specific threshold may be set with respect to numerical values that represent the "extent of child face", for example:

The child face score of a face whose "extent of child face" is equal to or above the threshold may be set at: the child face score=100.

The child face score of a face whose "extent of child face" is below the threshold may be set at: child face score=0.

As in the above example, the child face score may be set in a digital manner. Analog score setting is also possible. For example, the child face score may decrease gradually in value in accordance with the numerical value that represents the extent of child face.

Processes of steps S503 to S507 correspond to the processes of steps S204 to S208 described above with reference to FIG. 7. Specifically, in the present exemplary procedure, (a) the child face score and (b) the distance score are calculated at steps S502 and S503, respectively, and at step S504, the aggregate score is calculated based on these two types of scores, and the faces are sorted by aggregate score so that the faces are arranged in descending order of the aggregate score. The distance score is calculated in the same manner as that described above with reference to FIG. 8.

The aggregate score is calculated in the same manner as in the above-described exemplary procedure. For example, the aggregate score is calculated by adding the above different types of scores together while assigning weighting parameters to those scores. Specifically, assume in the following:

(a) the child face score=Sa; and (b) the distance score=and Sb.

Also, assume that weighting parameters p and q are set for the above scores. Then, the aggregate score [Sa11] is calculated by the following equation:

$$\text{the aggregate score } [Sa11] = p(Sa) + q(Sb).$$

At step S505, the number of faces detected in the currently processed frame, i.e., the frame that has just been subjected to the processes of calculating the above two types of scores and the aggregate score, is compared with the number of faces detected in the frame processed immediately previously, which has been selected at step S101 in the flowchart of FIG. 4 as a frame to be processed, to determine whether the number of faces detected in the currently processed frame is greater than the number of faces detected in the frame processed immediately previously. If the determination is positive, control proceeds to step S506. If the determination is negative, control proceeds to step S507.

At step S506, of the faces that have been sorted by aggregate score, one or more faces that have the highest aggregate score(s) are selected as the index face(s), and metainformation (e.g., the frame number, the position, the size, the face evaluation value score, the aggregate score, etc.) of the selected face(s) is outputted to the metainformation recording section. Thereafter, the process of step S104 as shown in FIG. 4, i.e., the metainformation recording process, is performed.

At step S507, position information concerning the faces detected in the currently processed face-detected frame is recorded on the memory. This information will be used when this frame is referred to as the reference frame (i.e., the reference frame 461 as shown in FIG. 8) when calculating the distance score at step S503.

In the present exemplary procedure, the process of calculating the extent of child face of each detected face is performed, and a higher score is given to a face having a higher extent of child face, so that the face having a higher extent of child face will be preferentially selected as the index. Therefore, in the case of data in which various people appear, child faces are preferentially selected and set as the indices.

Note that a series of processes described in the present specification can be implemented in either hardware or software or a combination of the both. In the case where the series of processes is implemented in software, a program in which a processing sequence is written may be installed into memory within a computer having a dedicated hardware structure and executed therein, or the program may be installed into a general-purpose computer capable of performing various types of processes and executed therein. The program may be recorded on a storage medium beforehand, for example. The program may be installed from the storage medium into the computer. Alternatively, the program may be received via a network, such as a local area network (LAN) or the Internet, and then installed into a storage medium, such as a hard disk, in the computer.

Also note that the various processes described in the present specification may be performed chronologically in the order in which they have been described in the present specification. Some of the processes may be performed in parallel or independently as needed or depending on a processing ability of a device that performs those processes.

As described above, according to one embodiment of the present invention, in the case where the face images to be used as the index images are selected from among the video image data, the scores for the faces detected in the image frame, such as the position score in accordance with the position of the face within the frame, the size score in accordance with the size of the face, the face evaluation value score in accordance with the extent of face likeliness, and the distance score in accordance with a difference in face-detected position with the previous face-detected frame, are calculated, and the face images having higher aggregate scores, which are calculated based on the above scores, are preferentially adopted as the indices. Therefore, it is possible to efficiently select only faces having high scores from among video image data in which a large number of faces appear, in order to generate face index information that is convenient for the user.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising
a representative face extraction circuit configured to detect face images in an image frame that forms part of video image data, and select, from the detected face images, a face image to be used as index information,
wherein said representative face extraction circuit is configured to calculate a score of each of the face images detected in the image frame based on characteristics of the face image, and
wherein said representative face extraction circuit is further configured to (i) calculate a position score of each of the face images detected in the image frame, the position score increasing in value as the face image is closer to a center of the image frame, (ii) calculate a size score of each of the face images detected in the image frame, the size score increasing in value as a size of the face image increases, iii) calculate a face evaluation value score of each of the face images detected in the image frame, the face evaluation value score increasing in value as an extent of face likeliness of the face image increases, and (iv) calculate an aggregate score of each of the face images using the position score, the size score, and the face evaluation value score, and select a detected face image whose aggregate score is high as an index-use face image.

2. The image processing apparatus according to claim 1, wherein said representative face extraction circuit is further configured to determine whether the number of face images detected in the image frame is greater than the number of face images detected in a previous face-detected frame, and select the detected face image whose aggregate score is high as the index-use face image when the number of face images detected in the image frame is greater than the number of face images detected in the previous face-detected frame.

3. An imaging apparatus, comprising:
an imaging section; and
a representative face extraction circuit configured to accept video image data obtained by photographing by said imaging section, detect face images in an image frame that forms part of the accepted video image data, and select, from the detected face images, a face image to be used as index information,
wherein said representative face extraction circuit is configured to calculate a score of each of the face images detected in the image frame based on characteristics of the face image, and
wherein said representative face extraction circuit further configured to (i) calculate a position score of each of the face images detected in the image frame, the position score increasing in value as face image is closer to a center of the image frame, (ii) calculate a size score of each of the face images detected in the image frame, the size score increasing in value as a size of the face image increases, (iii) calculate a face evaluation value score of each of the face images detected in the image frame, face evaluation value score increasing in value as an extent of face likeliness of the face image increases, and (iv) calculate an aggregate score of each of the face images using position score, the size score, and the face evaluation value score and select a detected face image whose aggregate score is high as an index-use face image.

4. An image processing method employed in an image processing apparatus including a representative face extraction unit, the method comprising the steps of:
the representative face extraction unit detecting face images in an image frame that forms part of video image data, and selecting, from the detected face images, a face image to be used as index information,
wherein said detecting and selecting step includes the steps of calculating a score of each of the face images detected in the image frame based on characteristics of the face image, and
wherein said detecting and selecting step further includes steps of (i) calculating a position score of each of the face images detected in the image frame, the position score increasing in value as the face image is closer to a center of the image frame, (ii) calculating a size score of each of the face images detected in the image frame, the size score increasing in value as a size of the face image increases, (iii) calculating a face evaluation value score of each of the face images detected in the image frame, the face evaluation value score increasing in value as an extent of likeliness of the face image increases, and (iv) calculating an aggregate score of each of the face images using the position score, the size score, and the face evaluation value score and select a detected face image whose aggregate score is high as an index-use face image.

5. The image processing method according to claim 4, wherein said detecting and selecting step includes the steps of determining whether the number of face images detected in the image frame is greater than the number of face images detected in a previous face-detected frame, and selecting the detected face image whose aggregate score is high as the index-use face image only when the number of face images detected in the image frame is greater than the number of face images detected in the previous face-detected frame.

6. A non-transitory computer-readable medium having stored thereon a computer program for causing an image processing apparatus including a representative face extraction unit to perform image processing, the computer program causing the representative face extraction unit to execute the steps of:
detecting face images in an image frame that forms part of video image data, and selecting, from the detected face images, a face image to be used as index information,
wherein said detecting and selecting step includes the steps of calculating a score of each of the face images detected in the image frame based on characteristics of the face image, and
wherein said detecting and selecting step further includes steps of (i) calculating a position score of each of the face images detected the image frame, the position score increasing in value as the face image is closer to a center of the image frame, (ii) calculating a size score of each of the face images detected in the image frame, the size score increasing in value as a size of the face image increases, (iii) calculating a face evaluation value score of each of the face images detected in the image frame, the face evaluation value score increasing in value as an extent of face likeliness of the face image increases, and (iv) calculating an aggregate score of each of the images using the position score, the size score, and the face evaluation value score, and select a detected face image whose aggregate score is high as an index-use face image.

7. An image processing apparatus, comprising
a unit to obtain video image data; and
representative face extraction means for detecting face images in an image frame that forms part of the video image data, and selecting, from the detected face images, a face image to be used as index information,
wherein said representative face extraction means is configured to calculate a score of each of the face images detected in the image frame based on characteristics of the face image, and
wherein said representative face extraction means is further configured to (i) calculate a position score of each of the face images detected in the image frame, the position score increasing in value as the face image is closer to a center of the image frame, (ii) calculate a size score of each of the face images detected in the image frame, the size score increasing in value as a size of the face image increases, (iii) calculate a face evaluation value score of each of the face images detected in the image frame, the face evaluation value score increasing in value as an extent of face likeliness of the face image increases, and (iv) calculate an aggregate score of each of the face images using the position score, the size score, and the face evaluation value score, and select a detected face image whose aggregate score high as an index-use face image.

8. An imaging apparatus, comprising:
imaging means; and
representative face extraction means for accepting video image data obtained by photographing by said imaging means, detecting face images in an image frame that forms part of the accepted video image data, and selecting, from the detected face images, a face image to be used as index information,
wherein said representative face extraction means is configured to calculate a score of each of the face images detected in the image frame based on characteristics of the face image, and
wherein said representative face extraction unit further configured to (i) calculate a position score of each of the face images detected in the image frame, the position score increasing in value as the face image is closer to a center of the image frame, (ii) calculate a size score of each of the face images detect in the image frame, the size score increasing in value as a size of the face image increases, (iii) calculate a face evaluation value score of each of the face images detected in the image frame, the face evaluation value score increasing in value as an extent of face likeliness of the face image increases, and (iv) calculate an aggregate score of each of the face images using the position score, the size score, and the face evaluation value score, and select a detected face image whose aggregate score is high as an index-use face image.

* * * * *